(12) United States Patent
Shida (10) Patent No.: US 7,227,953 B2
(45) Date of Patent: Jun. 5, 2007

(54) MPEG DATA RECORDER HAVING IEEE 1394 INTERFACE

(75) Inventor: Tetsuro Shida, Tokyo (JP)

(73) Assignee: Mitsubishi Denki K.K., Tokyo (JP)

(*) Notice: Subject to any disclaimer, the term of this patent is extended or adjusted under 35 U.S.C. 154(b) by 901 days.

(21) Appl. No.: 10/141,947

(22) Filed: May 10, 2002

(65) Prior Publication Data
US 2003/0118180 A1    Jun. 26, 2003

(30) Foreign Application Priority Data
Dec. 21, 2001 (JP) ............................ P2001-389433

(51) Int. Cl.
*H04N 7/167* (2006.01)
*G06F 13/20* (2006.01)
(52) U.S. Cl. .................... 380/203; 380/217; 726/31; 710/313
(58) Field of Classification Search ................ 380/200, 380/201, 203
See application file for complete search history.

(56) References Cited

U.S. PATENT DOCUMENTS

| | | | |
|---|---|---|---|
| 5,502,496 A * | 3/1996 | Hailey et al. ............... 348/462 |
| 5,987,126 A * | 11/1999 | Okuyama et al. ........... 380/203 |
| 6,118,871 A * | 9/2000 | Okuyama et al. ............ 380/201 |
| 6,526,144 B2 * | 2/2003 | Markandey et al. .......... 380/28 |
| 6,618,549 B1 * | 9/2003 | Kato et al. .................... 386/94 |
| 6,879,772 B1 | 4/2005 | Higurashi |
| 2002/0044657 A1 * | 4/2002 | Asano et al. ................ 380/201 |
| 2002/0085722 A1 * | 7/2002 | Asano et al. ................ 380/278 |
| 2002/0101989 A1 * | 8/2002 | Markandey et al. ......... 380/210 |
| 2002/0106018 A1 * | 8/2002 | D'Luna et al. ......... 375/240.01 |
| 2003/0016826 A1 * | 1/2003 | Asano et al. ................ 380/277 |

FOREIGN PATENT DOCUMENTS

| | | |
|---|---|---|
| JP | P2000-333124 | 11/2000 |
| JP | 2001-45435 A | 2/2001 |
| JP | P2001-223981 | 8/2001 |

* cited by examiner

*Primary Examiner*—Gilberto Barron, Jr.
*Assistant Examiner*—Virgil Herring
(74) *Attorney, Agent, or Firm*—Birch, Stewart, Kolasch & Birch, LLP (57) ABSTRACT

A copy-protected-state indicating MPEG-TS data output unit (3) holds a bit stream obtained by previously compressing and encoding image and/or audio data representing that recording desired by the user has ended in failure because the contents is copy-protected. When copy control information (V2) outputted from an IEEE 1394 interface (1) indicates a copy-protected state, a selecting unit (20) selects copy-protected-state indicating MPEG-TS data (V3) outputted from the copy-protected-state indicating MPEG-TS data output unit (3) and outputs it as to-be-recorded MPEG-TS data (V4). Thereby, the data (V3) is recorded.

8 Claims, 10 Drawing Sheets

| EMI (BINARY REPRESENTATION) | COPY PROTECTION STATUS |
|---|---|
| $00_2$ | Copy Free |
| $01_2$ | No More Copies |
| $10_2$ | Copy One Generation |
| $11_2$ | Copy Never |

< PRIOR ART >

FIG. 9

<PRIOR ART>

FIG. 10
<PRIOR ART>

| SB# | 1st byte |||||||| 2nd byte ||||||||
|---|---|---|---|---|---|---|---|---|---|---|---|---|---|---|---|---|
| | MSB |||||||LSB | MSB |||||||LSB |
| | bit7 | bit6 | bit5 | bit4 | bit3 | bit2 | bit1 | bit0 | bit7 | bit6 | bit5 | bit4 | bit3 | bit2 | bit1 | bit0 |
| 2×6n | Format info. |||||||| Syns block info. ||||||||
| 2×6n +1 | Format ID |||||| D.T. | S.B.C. | Data detail ||||||||
| 2×(6n+1) | | | | | | | D.T. | S.B.C. | Data detail ||||||||
| 2×(6n+1)+1 | | | | | | | D.T. | S.B.C. | Data detail ||||||||
| 2×(6n+2) | | | | | | | D.T. | S.B.C. | Data detail ||||||||
| 2×(6n+2)+1 | | | | | | | D.T. | S.B.C. | Data detail ||||||||
| 2×(6n+3) | | | | | | | D.T. | S.B.C. | Data detail ||||||||
| 2×(6n+3)+1 | | | | | | | D.T. | S.B.C. | Data detail ||||||||
| 2×(6n+4) | Application detail |||||||| D.T. | S.B.C. | Data detail ||||||
| 2×(6n+4)+1 | Time compression ratio |||||||| D.T. | S.B.C. | Data detail ||||||
| 2×(6n+5) | / CGMS | Reserved ||||||| D.T. | S.B.C. | Data detail ||||||
| 2×(6n+5)+1 | Reserved |||||||| D.T. | S.B.C. | Data detail ||||||

FIG. 11
⟨PRIOR ART⟩

| SB# | m = 0 | | | | m = 1 | | | |
|---|---|---|---|---|---|---|---|---|
| | bit7 | bit6 | bit5 | bit4 | bit7 | bit6 | bit5 | bit4 |
| 2×6n +m | ECC block size | ECC block number per track | | Program mode | | | Scanner rotation speed | |
| 2×(6n+1)+m | 1.001flag | Outer interleave | | | Recording mode | | | |
| 2×(6n+2)+m | Reserved | | | | | | | |
| 2×(6n+3)+m | Application ID | | | | Reserved | | | |

FIG.12

<PRIOR ART>

| CGMS (BINARY REPRESENTATION) | COPY PROTECTION STATUS |
|---|---|
| $00_2$ | Copy Permitted |
| $01_2$ | No Information |
| $10_2$ | One Generation Of Copy Permitted |
| $11_2$ | Copy Restricted |

MPEG DATA RECORDER HAVING IEEE 1394 INTERFACE

BACKGROUND OF THE INVENTION

1. Field of the Invention

The present invention relates to a copy protection technique for use in devices for recording digital contents (such as D-VHS VCRs or DVD recorders).

2. Description of the Background Art

Recently, digitization of contents distributed, for example, in broadcasts and over the Internet has advanced and VTRs capable of recording and playing back such digital contents or data as it is have been developed. In such digital recording systems, no data degradation occurs even if the data is copied to a recording medium and thus it is easily possible to generate the same duplicate as an original. From this, the necessity for securing a copyright on the contents is in strong demand.

The IEEE 1394 interface (LSI circuit) is becoming a prominent digital interface for use in digital AV (Audio Visual) data communications between digital equipment. One of widely adopted copy protection systems in the IEEE 1394 interface is the 5C DTCP (Digital Transmission Content Protection) scheme standardized by the CPTWG (Copy Protection Technical Working Group).

The 5C DTCP defines three levels of copy protection states for restricting copying of transmission data, namely, "Copy Never" (copy protected), "Copy One Generation" (only one generation of copy permitted) and "Copy Free" (free copy permitted). In data recording, the following control is effectuated according to this status information: (1) When the status information indicates a "Copy Never" state, data recording is not made; (2) when the status information indicates a "Copy Free" state, data recording is made; and (3) when the status information indicates a "Copy One Generation" state, data recording is made after the current status information is changed into "Copy Never" or "No More Copies" which indicates that recording has already been made. Such information is called CCI (Copy Control Information). The CCI is generally contained in transmission data and its storage location and definition vary depending on the data format.

To handle digital contents including such CCI to meet the copyright owner's or user's needs, recording equipment having the function of reading and writing CCI contents is required. However, handling the CCI is not easy for such equipment that records and reproduces transmission data without much concern for the data format (such as D-VHS video recorders or DVD recorders).

Figure 5:
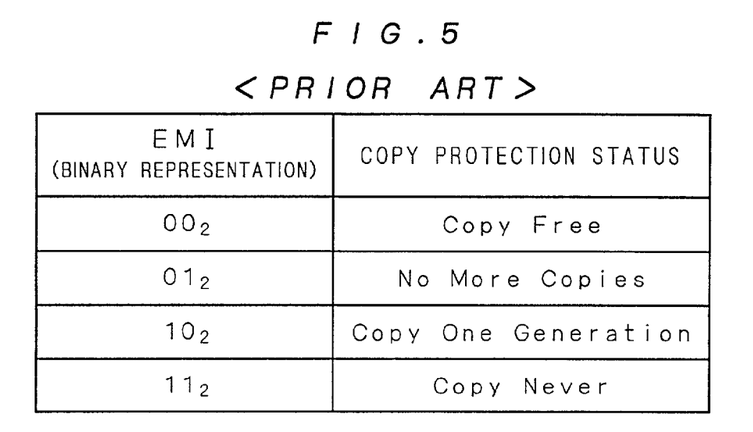
FIG. 5 illustrates values of the EMI field and their respective meanings in the IEEE 1394 interface standard.

The 5C DTCP scheme, therefore, provides an EMI (Encryption Mode Indicator) field indicating CCI contents, inside a transfer packet header so that even the equipment as above described operating without much concern for the data format can readily achieve copy control. As shown in FIG. 5, the CCI in the EMI field is represented as two bits. More specifically, a 2-bit binary value "00" represents a "Copy Free" state; a binary value "01" represents a "No More Copies" state; a binary value "10" represents a "Copy One Generation" state; and a binary value "11" represents a "Copy Never" state. The EMI provides the "No More Copies" state which is not provided by the CCI. This state means that MPEG data in packet data, including CCI indicating a "Copy One Generation" state, has been recorded once and thus no more recording thereof is permitted.

Figure 6:
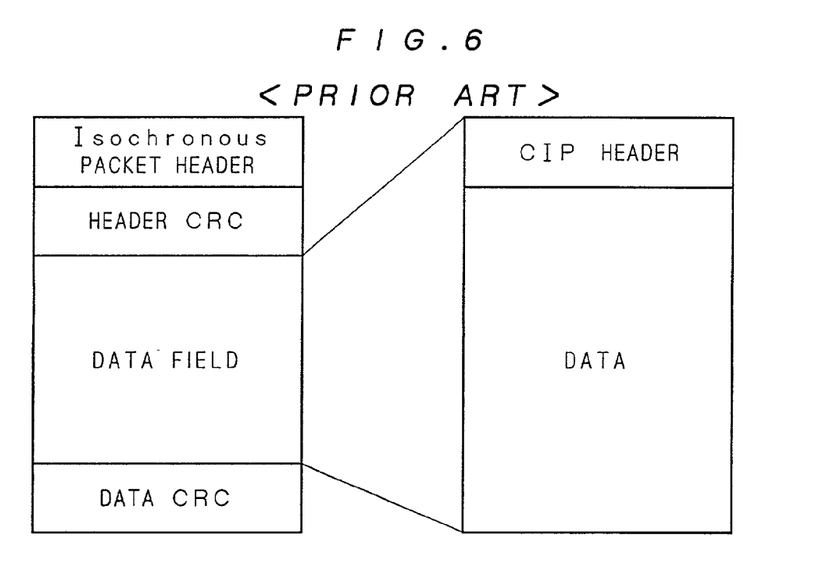
FIG. 6 illustrates a data structure of an isochronous packet.
Figure 7:
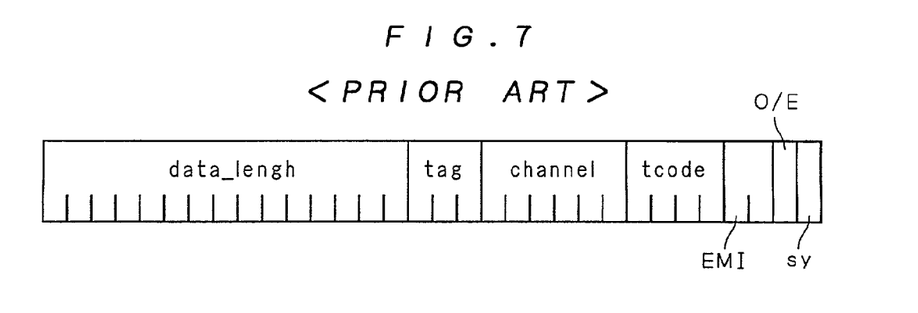
FIG. 7 illustrates the location of the EMI field in an isochronous packet header.

In the IEEE 1394 interface standard, as shown in FIG. 6, a CIP header is added to data transmitted over a bus and further an isochronous packet header is provided. In IEEE 1394 isochronous packet transmission, the EMI is transmitted as part of the isochronous packet header (FIG. 6) as shown in FIG. 7.

The 5C DTCP scheme performs data encryption when copy-controlled data is transmitted, i.e., when the EMI is set to either "Copy Never", "Copy One Generation" or "No More Copies". And, the key to decrypt the data is given only to equipment (sink) authorized by data transmission equipment (source). Thereby the 5C DTCP scheme prevents the CCI from being tapped or tampered with by other unauthorized equipment.

Data encryption is performed in various modes according to the EMI of data: "Copy Never"; "Copy One Generation"; or "No More Copies". Thus, data receiving equipment (sink) should perform data decryption in a mode responsive to the EMI value. Accordingly, even if the EMI value is tapered with during transmission, the sink cannot decrypt data properly, which thereby prevents unauthorized copying.

However, it is impossible to record CCI on a recording medium without changing the data format including CCI or EMI for preventing unauthorized copying on channels; therefore, another CCI for preventing unauthorized copying is required to add to data on the recording medium.

The D-VHS standard defines three levels of CCI called CGMS (Copy Generation Management System) to prevent unauthorized copying of recording data. This CGMS allows easy copy control even with equipment operating without much concern for the data format. In the D-VHS standard, a CGMS field indicating CCI contents is provided in a header of D-VHS recording data.

Figure 8:
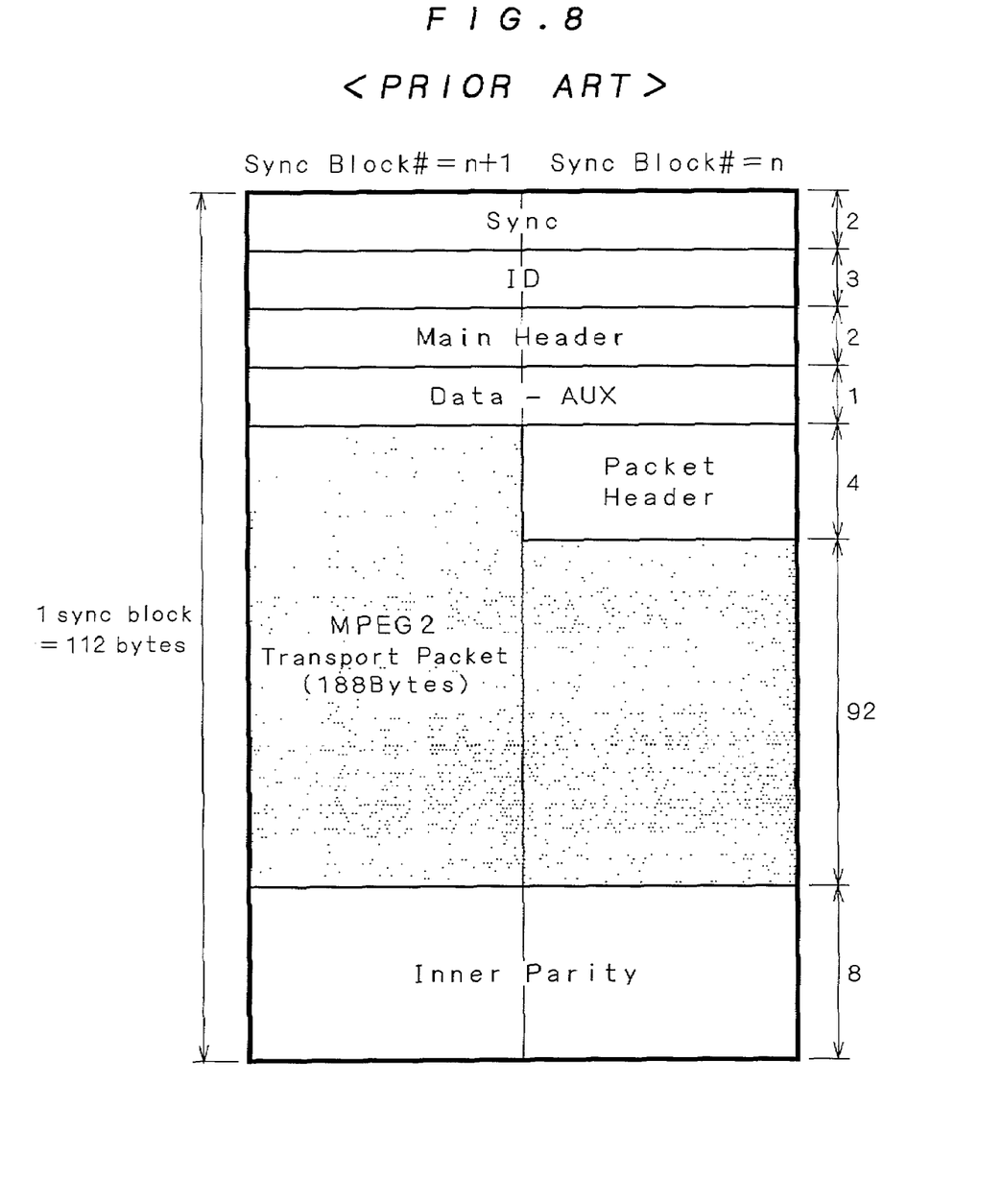
FIG. 8 illustrates a data structure of sync blocks in the D-VHS standard.
Figure 9:
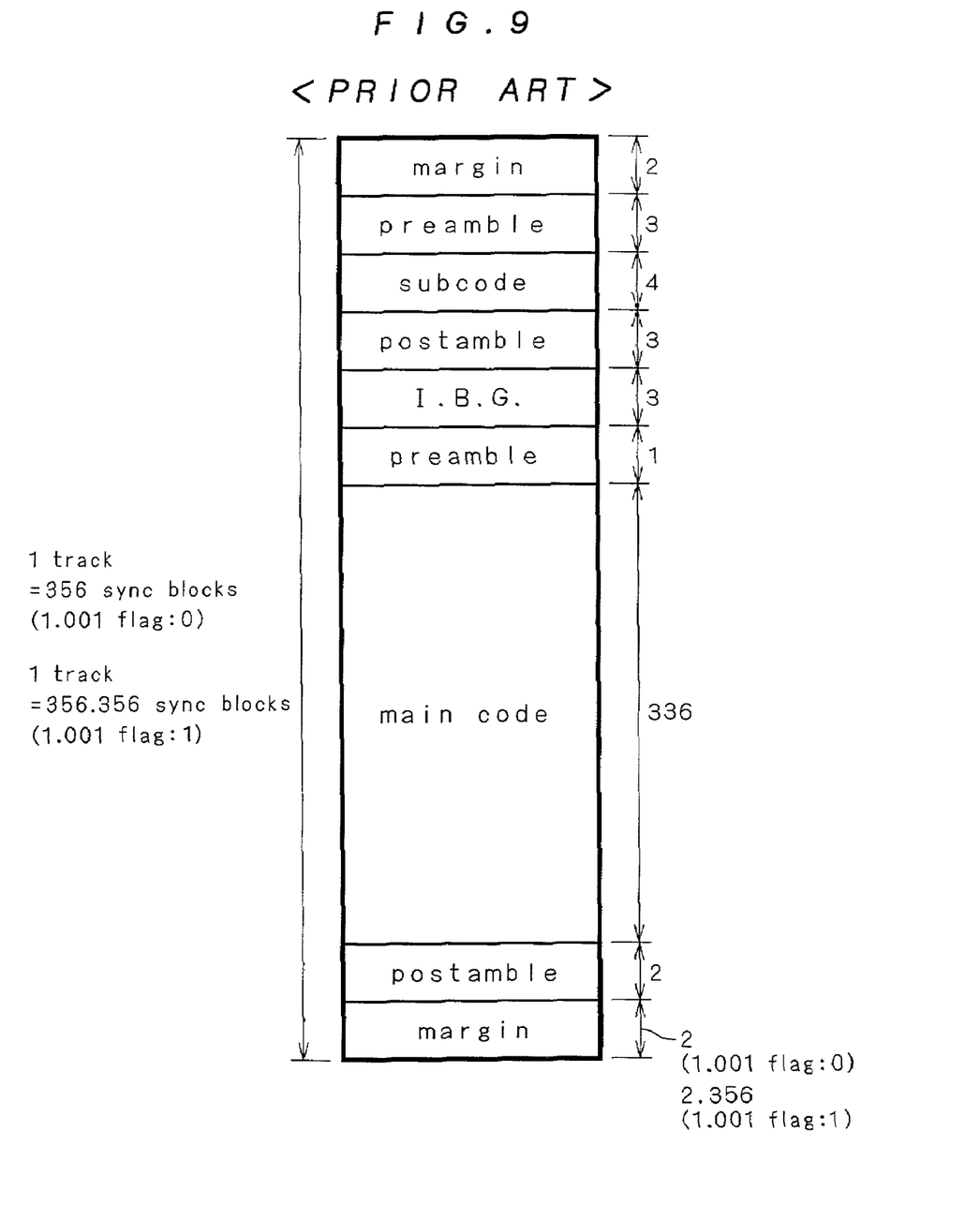
FIG. 9 illustrates a data structure of a single track in the D-VHS standard.

In the D-VHS standard, when recording data is in the "MPEG-2 transport packet" form, each MPEG-2 transport packet of recording data (188 bytes) is divided into two parts, i.e., 96 bytes of data and 92 bytes of data, and stored in two sync blocks as shown in FIG. 8. These sync blocks are stored in a main code area of a track structure as shown in FIG. 9 and recorded on a recording medium. Herein, the "track" refers to a unit of recording data recorded on a recording medium in the D-VHS standard.

Figure 10:
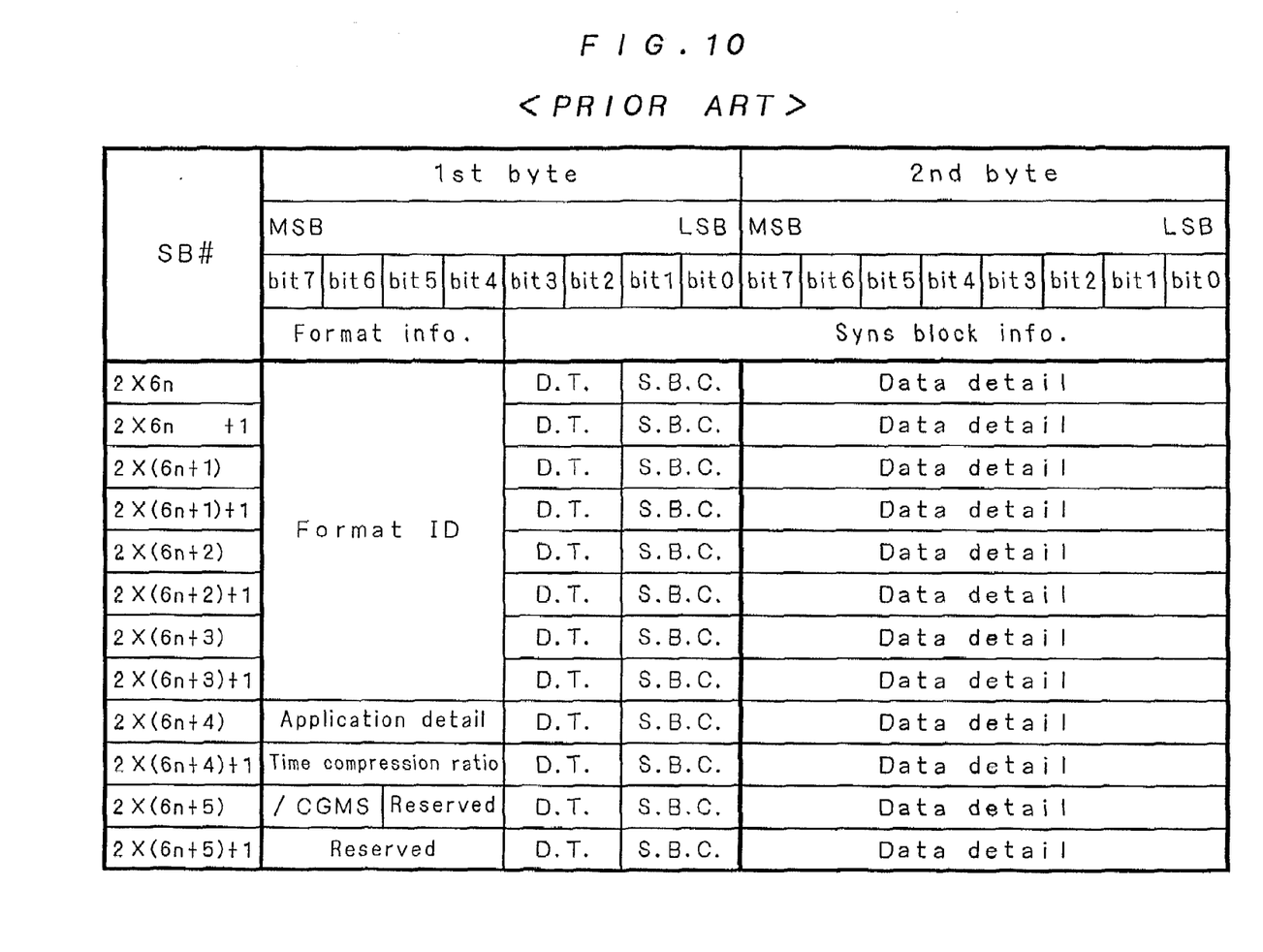
FIGS. 10 and 11 illustrate a data structure of a main header in the D-VHS standard.
Figure 11:
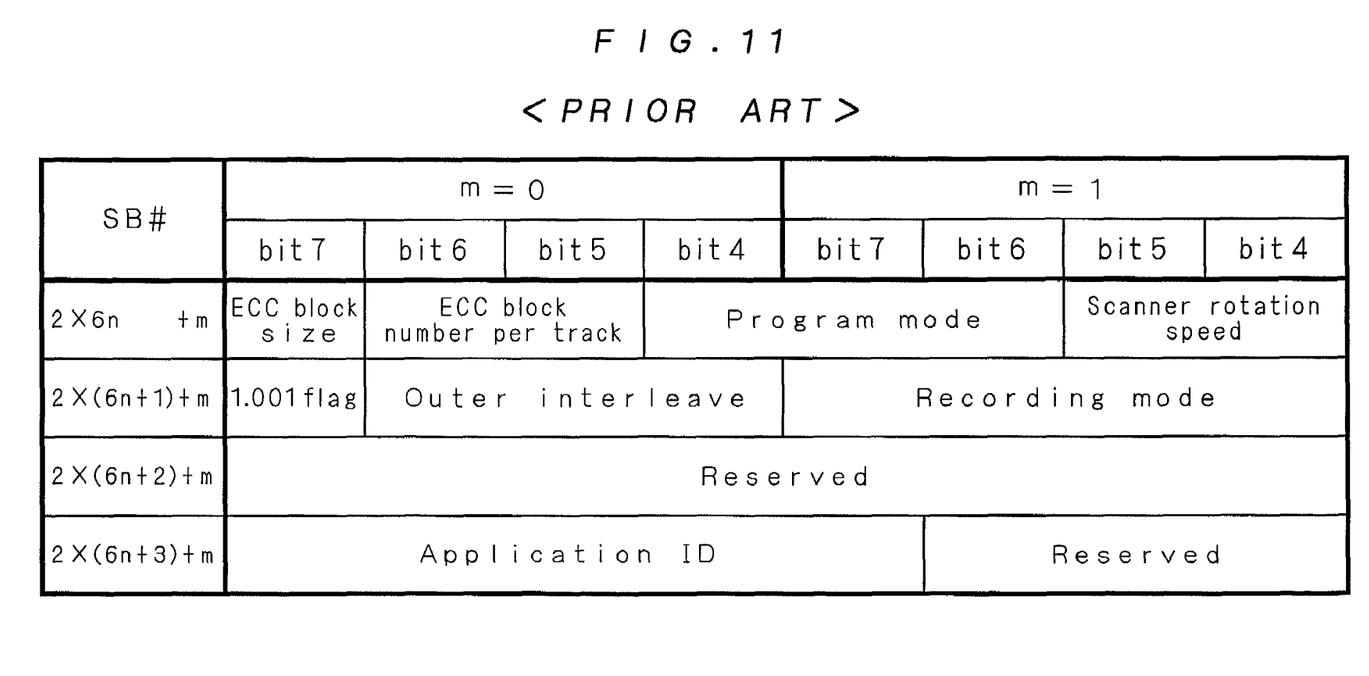

A main header (FIG. 8) is described by a set of 12 sync blocks as shown in FIGS. 10 and 11. In a set of 12 sync blocks, a field composed of two bits, bit 7 and bit 6, of the first byte of the eleventh sync block represents /CGMS data indicating CCI of an MPEG-2 transport packet of recording data.

Figure 12:
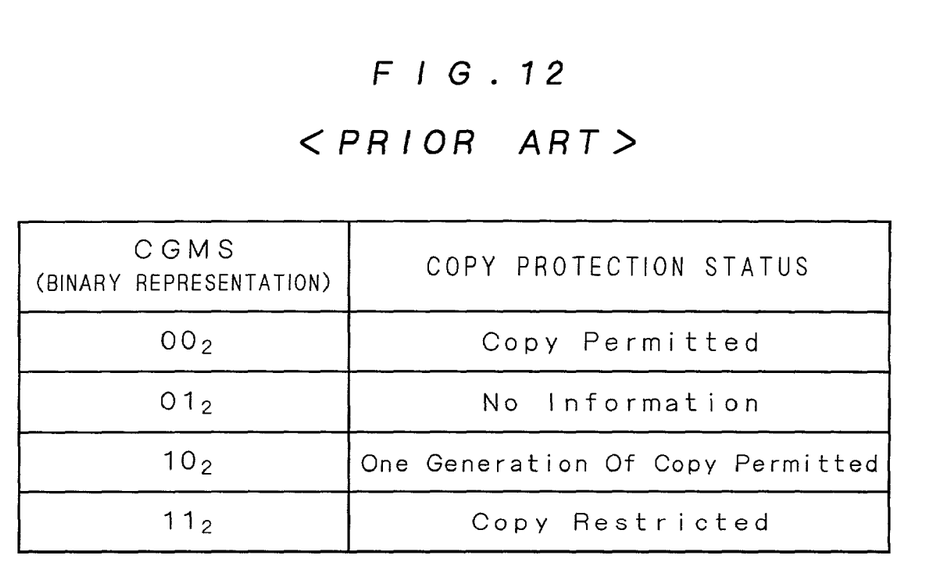
FIG. 12 illustrates values of a CGMS field and their respective meanings in the D-VHS standard.

As shown in FIG. 12, CGMS data is composed of two bits. More specifically, a 2-bit binary value "00" represents a "Copy Permitted" state for permitting copying; a binary value "01" represents a "No Information" state for an invalid value; a binary value "10" represents a "One Generation of Copy Permitted" for permitting only one generation of copying; and a binary value "11" represents a "Copy Restricted" state for restricting copying. The /CGMS field (FIG. 10) in the main header (FIG. 8) holds a value obtained by inverting the CGMS data bits.

In digital recording of data contents received via the IEEE 1394 digital interface with digital recorders such as D-VHS VCRs or DVD recorders, when the EMI of transmission data is set to either "Copy Never" or "No More Copies", either the data recording itself will not be made or invalid data will be recorded since the contents is copy-protected.

If the users try to make recording of contents whose EMI is set to "Copy Never" or "No More Copies" without knowing the CCI of the contents, recording intended by the user will result in failure, in which case the users cannot easily know the cause of the failure at the time of playback.

The users thus might possibly mistake it for the breakdown of their recorders and then bring their complaints, for example, against recorder manufactures. This may become a heavy burden on the recorder manufactures.

SUMMARY OF THE INVENTION

The present invention has been designed to address the aforementioned problems and an object thereof is to allow the users, when they tried and failed to make recording of copy-protected digital contents, to easily find out the reason of the failure with a simple circuit configuration.

According to a first aspect of the present invention, an MPEG data selector includes a digital interface, a copy-protected-state indicating MPEG-TS data output unit, and an MPEG-TS data selecting unit. The digital interface has an input terminal receiving digital data which includes MPEG-TS data of digital contents and copy control information for use in preventing unauthorized copying of the digital contents, a first output terminal outputting the MPEG-TS data, and a second output terminal outputting a copy control signal. The digital interface is to extract the MPEG-TS data from the digital data received and to detect the copy control information from the digital data to generate the copy control signal indicating the contents of the copy control information. The copy-protected-state indicating MPEG-TS data output unit holds copy-protected-state indicating MPEG-TS data and has an output terminal outputting the copy-protected-state indicating MPEG-TS data. The copy-protected-state indicating MPEG-TS data is obtained by previously compressing and encoding, in MPEG format, data representing that the copy control information indicates a copy-protected state. The MPEG-TS data selecting unit has a first input terminal connected to the first output terminal of the digital interface, a second input terminal connected to the second output terminal of the digital interface, a third input terminal connected to the output terminal of the copy-protected-state indicating MPEG-TS data output unit, and an output terminal outputting to-be-recorded MPEG-TS data. The MPEG-TS data selecting unit is to select either the MPEG-TS data or the copy-protected-state indicating MPEG-TS data as the to-be-recorded MPEG-TS data according to the contents of the copy control information given by the copy control signal.

This MPEG data selector eliminates the need to provide a circuit for generating data representing that copying was not made because the copy control information indicates the copy-protected state, thereby achieving the effect of facilitating the selection, output and recording of such data as the to-be-recorded MPEG-TS data.

According to a second aspect of the present invention, an MPEG data selector includes an IEEE 1394 interface, a read only memory, and a signal selection switch. The IEEE 1394 interface is to receive digital data in isochronous packet form. The read only memory is to hold copy-protected-state indicating MPEG-TS data which is obtained by previously compressing and encoding, in MPEG format, data representing that copy control information contained in the digital data indicates a copy-protected state. The signal selection switch has a first input terminal receiving MPEG-TS data extracted from the digital data and outputted from the IEEE 1394 interface, a second input terminal receiving the copy-protected-state indicating MPEG-TS data outputted from the read only memory, and an output terminal outputting to-be-recorded MPEG-TS data. The signal selection switch is to connect the first input terminal to the output terminal when the copy control information extracted from the digital data and outputted from the IEEE 1394 interface indicates a state other than the copy-protected state, and to connect the second input terminal to the output terminal when the copy control information indicates the copy-protected state.

According to a third aspect of the present invention, an MPEG data recorder includes the MPEG data selector as set forth in the first aspect and a signal recording device. The signal recording device is to record the to-be-recorded MPEG-TS data outputted from the MPEG data selector on a predetermined recording medium.

Preferably, in the MPEG data recorder, the signal recording device sets a predetermined time limit for recording of the copy-protected-state indicating MPEG-TS data on the predetermined recording medium when the to-be-recorded MPEG-TS data is the copy-protected-state indicating MPEG-TS data. The predetermined time limit is determined based on the amount of time that a user, at the time of playback, will be able to recognize that recording of the MPEG-TS data extracted from the digital data could not be made because the copy control information indicates the copy-protected state.

This MPEG data recorder sets an optimum time limit for recording of data representing that copying was not made because the copy control information indicates a copy-protected state, thereby achieving the effect of allowing effective use of a recording area in the recording medium.

Preferably, in the MPEG data recorder, the signal recording device, after performing a format conversion of the to-be-recorded MPEG-TS data into D-VHS format data, records the D-VHS format data on the predetermined recording medium. The signal recording device, when the to-be-recorded MPEG-TS data is the copy-protected-state indicating MPEG-TS data, detects whether information about the number of screens for trickplay data for high-speed search generated at the time of the format conversion coincides with a specific number of screens which has been held in the signal recording device, and when they coincides with each other, the signal recording device stops recording of the copy-protected-state indicating MPEG-TS data on the predetermined recording medium. The specific number of screens is determined based on the number of screens that the user, at the time of high-speed search playback, will be able to recognize that recording of the MPEG-TS data extracted from the digital data could not be made because the copy control information indicates the copy-protected state.

This MPEG data recorder sets, even at the time of high-speed search playback, a time limit for recording of data representing that copying was not made because the copy control information indicates the copy-protected state, thereby achieving the effect of allowing effective use of a recording area in the recording medium.

These and other objects, features, aspects and advantages of the present invention will become more apparent from the following detailed description of the present invention when taken in conjunction with the accompanying drawings.

DESCRIPTION OF THE PREFERRED EMBODIMENTS

An MPEG data recorder according to the present invention comprises data storage such as a ROM (read-only memory) for holding bit stream data (MPEG-TS data) obtained by previously compressing and encoding data (composed of image and/or audio) representing that recording intended by the user has ended in failure because copy control information (CCI) of the contents indicates a copy-protected state. The MPEG data recorder is for recording the above bit stream data on a recording medium according to the CCI of the contents. Hereinbelow, the present invention will be described in more detail with reference to the drawings illustrating preferred embodiments of the present invention.

(First Preferred Embodiment)

Figure 1:
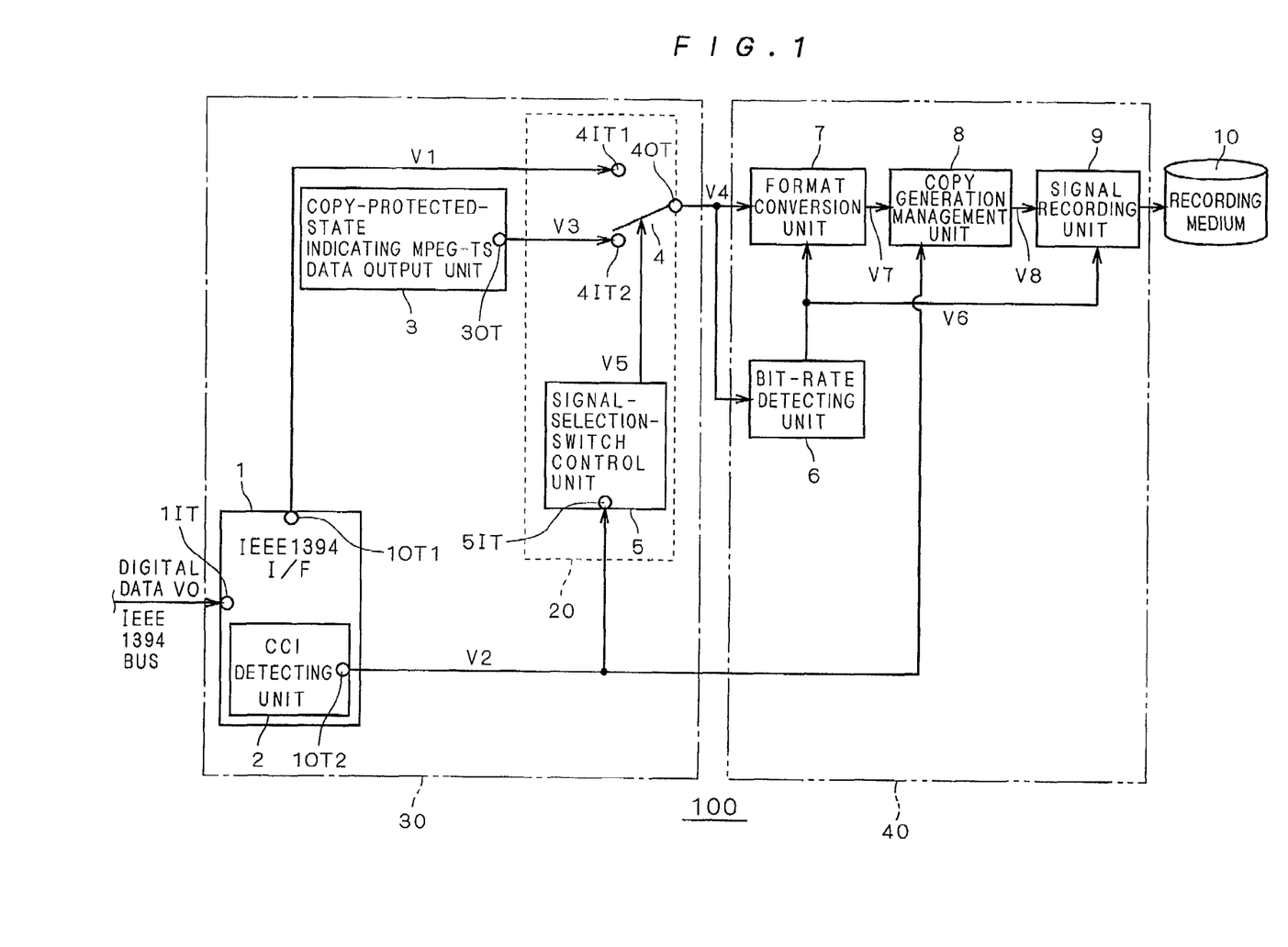
FIG. 1 is a partial block diagram illustrating a configuration of an MPEG data recording and playback device according to a first preferred embodiment of the present invention.

FIG. 1 is a block diagram illustrating by way of example a configuration of an MPEG data recording and playback device 100 according to a preferred embodiment of the present invention. However, a recording data playback circuit in this device 100 is omitted from FIG. 1 and the same can be said of the following drawings, FIGS. 2 through 4. As shown in FIG. 1, the main part of the MPEG data recording and playback device 100 is roughly divided into two parts: an MPEG data selector 30 and a signal recorder 40 for recording to-be-recorded MPEG-TS data V4 outputted from the selector 30 on a predetermined recording medium 10. Here, the "MPEG-TS (transport stream) data" refers to data including "MPEG-PTS (partial transport stream) data". The MPEG data selector 30 forming the core of this preferred embodiment comprises an IEEE 1394 interface (corresponding to a high-speed digital interface) 1, a copy-protected-state indicating MPEG-TS data output unit 3 including for example a ROM (read-only memory), and an MPEG-TS data selecting unit 20. The MPEG-TS data selecting unit 20 includes a signal selection switch 4 and a signal-selection-switch control unit 5 controlling actuation of the switch 4. The following description gives the details of each unit.

In FIG. 1, digital data V0 transmitted over an IEEE 1394 bus which provides interconnection between external digital equipment (not shown) such as digital TVs and the IEEE 1394 interface 1 is isochronous packet data containing MPEG-TS data of digital contents and CCI thereof for use in preventing unauthorized copying of the digital contents. The IEEE 1394 interface 1 has (1) an input terminal 1IT connected to the IEEE 1394 bus and receiving the digital data V0, (2) a first output terminal 1OT1, and (3) a second output terminal 1OT2. The interface 1 extracts MPEG-TS data V1 from the received digital data V0 and outputs the extracted data V1 from the first output terminal 1OT1. The IEEE 1394 interface 1 further includes (4) a CCI detecting unit 2. The CCI detecting unit 2 has the function of detecting CCI from the digital data V0 to generate a copy control signal V2 indicating CCI contents and outputting the signal V2 from the second output terminal 1OT2.

The copy-protected-state indicating MPEG-TS data output unit 3 holds copy-protected-state indicating MPEG-TS data V3 and has the function of outputting the data V3 from its output terminal 3OT. The copy-protected-state indicating MPEG-TS data V3 is obtained by previously compressing and encoding, in the MPEG format, data (composed of image and/or audio) representing that CCI contained in the EMI field of MPEG-TS data desired to be recorded by the user indicates a "copy-protected" state. The bit rate of the copy-protected-state indicating MPEG-TS data V3 is preset to the minimum value of a plurality of bit rates at which the MPEG data recording and playback device 100 can make recording. This setting brings about an additional effect of allowing effective use of a recording area in the recording medium 10. It is, however, to be understood that the bit rate of the copy-protected-state indicating MPEG-TS data V3 does not necessarily need to be set to the above minimum value.

The MPEG-TS data selecting unit 20 has (1) a first input terminal 4IT1 connected to the first output terminal 1OT1, (2) a second input terminal 4IT2 connected to the output terminal 3OT, (3) a third input terminal 5IT connected to the second output terminal 1OT2, and (4) an output terminal 4OT outputting the to-be-recorded MPEG-TS data V4. The selecting unit 20 has the function of selecting and outputting either the MPEG-TS data V1 or the copy-protected-state indicating MPEG-TS data V3 as the to-be-recorded MPEG-TS data V4 according to CCI contents given by the copy control signal V2. That is, the selecting unit 20 selects, as the to-be-recorded MPEG-TS data V4, (A) the MPEG-TS data V1 when the CCI indicates a non-copy-protected state and (B) the copy-protected-state indicating MPEG-TS data V3 when the CCI indicates a copy-protected state. More specifically, the signal-selection-switch control unit 5 generates and outputs a control signal V5 for driving the signal selection switch 4 according to CCI contents obtained from the CCI detecting unit 2. In accordance with instructions from this control signal V5, the signal selection switch 4 performs, as above described, switching between the MPEG-TS data V1 outputted from the IEEE 1394 interface 1 and the MPEG-TS data V3 outputted from the copy-protected-state indicating MPEG-TS data output unit 3.

A bit-rate detecting unit 6 is a circuit for detecting the bit rate or data rate of the to-be-recorded MPEG-TS data V4 outputted from the signal selection switch 4 and generating and outputting, according to the detected bit rate, a recording-mode information signal V6 that gives information about a selected optimum recording mode. By comprising this bit-rate detecting unit 6, the signal recorder 40 achieves, as will be described later, the function of changing the recording rate according to the data rate of the to-be-recorded MPEG-TS data V4, thereby allowing effective use of a recording area in the recording medium 10.

A format conversion unit 7 is a circuit for converting the to-be-recorded MPEG-TS data V4 outputted from the signal selection switch 4 into D-VHS format data V7 on the basis of the recording-mode information signal V6.

A copy generation management unit 8 is a circuit for managing CCI (data in the CGMS field) contained in a header of the D-VHS format data V7 outputted from the format conversion unit 7 according to the CCI (EMI) given by the copy control signal 2.

A signal recording unit 9 is a portion (such as a recording head) where D-VHS format data V8 obtained from the copy generation management unit 8 is written on the D-VHS recording medium 10 in a recording mode given by the recording-mode information signal V6.

The D-VHS recording medium 10 is a portion (such as a magnetic tape) where the data written by the signal recording unit 9 is stored.

Next, the operation of the MPEG data recording and playback device 100 according to this preferred embodiment will be described with reference to FIG. 1.

In FIG. 1, the digital data V0 received via the IEEE 1394 interface 1 is IEEE 1394 isochronous packet data. The isochronous packet is, as shown in FIG. 6, composed of an isochronous packet header, a header CRC which is a CRC of the isochronous packet header, a data field, and data CRC which is a CRC of the data field. Further, the data field is composed of a CIP header and data. The IEEE 1394 interface 1 extracts the data field of FIG. 6 from the digital data V0 received in isochronous packet form and further extracts data from the extracted data field. This extracted data corresponds to an MPEG-TS bit stream (MPEG-TS data), which is then transmitted to the first input terminal 4IT1 of the signal selection switch 4.

The isochronous packet header (FIG. 6) of the digital data V0 received via the IEEE 1394 interface 1 has an EMI field as shown in FIG. 7. Data in this EMI field corresponds to CCI of MPEG-TS data transmitted in isochronous packet. More specifically, as shown in FIG. 5, the EMI field is composed of two bits of data, defining four levels of CCI (Copy Free, No More Copies, Copy One Generation, and Copy Never). The CCI detecting unit 2 detects the CCI from the EMI field in the isochronous packet header of the digital data V0 received via the IEEE 1394 interface 1 and outputs the copy control signal V2 indicating the CCI to the signal-selection-switch control unit 5 and to the copy generation management unit 8.

When the CCI of the MPEG-TS data of contents desired to be recorded by the user indicates a copy-protected state, the copy-protected-state indicating MPEG-TS data output unit 3 outputs the copy-protected-state indicating MPEG-TS data V3 which is to be recorded on the recording medium 10 instead of the contents, to the second input terminal 4IT2 of the signal selection switch 4. The copy-protected-state indicating MPEG-TS data V3 is an MPEG-TS bit stream representing, with text and/or graphics and/or audio, that the device 100 could not record the contents because the CCI of the contents indicates a copy-protected state.

The copy-protected-state indicating MPEG-TS data V3 itself does not need to be treated as copy-protected data; therefore, CCI of the copy-protected-state indicating MPEG-TS data V3 may be set to either a "Copy Free" or "Copy One Generation" state. In the present example, for the sake of convenience, the CCI of the copy-protected-state indicating MPEG-TS data V3 shall be set to a "Copy Free" state.

The signal-selection-switch control unit 5 controls switching operation of the signal selection switch 4 according to CCI contents given by the copy control signal V2. Consequently, the signal selection switch 4 selects either the MPEG-TS data V1 transmitted from the IEEE 1394 interface 1 or the copy-protected-state indicating MPEG-TS data V3 transmitted from the copy-protected-state indicating MPEG-TS data output unit 3 as the to-be-recorded MPEG-TS data V4 and transmits the selected data V4 to the bit-rate detecting unit 6 and the format conversion unit 7.

When the CCI given by the copy control signal V2 indicates "Copy Free", recording of the contents is permitted and thus the signal-selection-switch control unit 5 generates and outputs a control signal V5 to instruct the signal selection switch 4 to interconnect the first input terminal 4IT1 and the output terminal 4OT. Consequently, under the control of the control signal V5, the signal selection switch 4 establishes interconnection between those terminals 4IT1 and 4OT, thereby to select the MPEG-TS data V1 transmitted from the IEEE 1394 interface 1 as the to-be-recorded MPEG-TS data V4 and transmit the data V4 to the bit-rate detecting unit 6 and the format conversion unit 7.

When the CCI transmitted from the CCI detecting unit 2 indicates "Copy One Generation", only one generation of recording of the contents is permitted and thus the signal-selection-switch control unit 5 outputs, in similar fashion, a control signal V5 to instruct the signal selection switch 4 to interconnect the first input terminal 4IT1 and the output terminal 4OT. Consequently the signal selection switch 4 transmits the MPEG-TS data V1 transmitted from the IEEE 1394 interface 1 to the bit-rate detecting unit 6 and the format conversion unit 7.

When the CCI transmitted from the CCI detecting unit 2 indicates "No More Copies", on the other hand, recording of the contents is prohibited and thus the signal-selection-switch control unit 5 generates and outputs a control signal V5 to instruct the signal selection switch 4 to interconnect the second input terminal 4IT2 and the output terminal 4OT. Consequently, under the control of the control signal V5, the signal selection switch 4 establishes interconnection between those terminals 4IT2 and 4OT, thereby to transmit the copy-protected-state indicating MPEG-TS data V3 transmitted from the copy-protected-state indicating MPEG-TS data output unit 3 to the bit-rate detecting unit 6 and the format conversion unit 7.

When the CCI transmitted from the CCI detecting unit 2 indicates "Copy Never", recording of the contents is prohibited and thus the signal-selection-switch control unit 5 outputs, in similar fashion, a control signal V5 to instruct the signal selection switch 4 to interconnect the second input terminal 4IT2 and the output terminal 4OT. Consequently, the signal selection switch 4 transmits the copy-protected-state indicating MPEG-TS data V3 transmitted from the copy-protected-state indicating MPEG-TS data output unit 3 to the bit-rate detecting unit 6 and the format conversion unit 7.

The bit-rate detecting unit 6 detects the bit rate of the to-be-recorded MPEG-TS data V4 outputted from the signal selection switch 4 and determines a recording mode according to the detected bit rate. In the D-VHS standard, there exist six kinds of recording modes called HS, STD, LS2, LS3, LS5, and LS7. For example, the recording rates in some of the modes are as follows: about 28.2 Mbps in the HS mode; about 14.1 Mbps in the STD mode; about 7 Mbps the LS2 mode; and about 4.7 Mbps in the LS3 mode. Of the plurality of recording modes in the D-VHS standard, the bit-rate detecting unit 6 selects a few recording modes adaptable for data recording at the detected bit rate and further selects one recording mode in which the recording rate is the lowest from the above selected recording modes. The bit-rate detecting unit 6 then transmits information about the ultimate recording mode as the signal V6 to the format conversion unit 7 and the signal recording unit 9. When the to-be-recorded MPEG-TS data V4 is the copy-protected-state indicating MPEG-TS data V3, the recording rate of the data V3 is, as previously described, preset to the minimum value; therefore, in the above operation, the bit-rate detecting unit 6 selects the preset recording mode.

The format conversion unit 7 converts the MPEG-TS data V4 transmitted via the signal selection switch 4 into the D-VHS format data V7. More specifically, the format conversion unit 7 stores the received MPEG-TS data V4 in sync blocks as shown in FIG. 8 and further stores those sync blocks in the main code area of the track structure as shown in FIG. 9, thereby to perform format conversion from the MPEG-TS data V4 to the D-VHS format data V7. The format conversion unit 7 also stores a 4-bit code value in a recording mode area (FIG. 11) of the main header (FIG. 8) on the basis of the recording-mode information signal V6 transmitted from the bit-rate detecting unit 6. For example, when the recording mode information indicates the HS mode, a binary value "0001" is stored; when the recording mode information indicates the STD mode, a binary value "0000" is stored; and when the recording mode information indicates the LS3 mode, a binary value "0011" is stored. In this fashion, the recording mode information selected by the bit-rate detecting unit 6 is encoded into a 4-bit value.

The copy generation management unit 8, as shown in FIG. 10, manages CGMS field data (/CGMS) contained in the main header of the sync block structure of the D-VHS format data V7 transmitted from the format conversion unit 7, according to the CCI (EMI) transmitted from the CCI detecting unit 2. The following is a more detailed description.

When the CCI transmitted from the CCI detecting unit 2 to the copy generation management unit 8 indicates "Copy Free", recording of the contents is permitted and thus the copy generation management unit 8 stores a binary value "00" in the CGMS field of the D-VHS format data V7 to make the copy protection status of the D-VHS format data V7 into "Copy Permitted".

When the CCI transmitted from the CCI detecting unit 2 to the copy generation management unit 8 indicates "No More Copies", recording of the contents is prohibited. However, at this time, the MPEG-TS data V4 transmitted as a result of signal selection by the signal selection switch 4 to the copy generation management unit 8 is the copy-protected-state indicating MPEG-TS data V3 which is permitted to be recorded on the recording medium 10. Thus, the copy generation management unit 8 stores a binary value "00" in the CGMS field of the D-VHS format data V7 to make the copy protection status of the D-VHS format data V7 into "Copy Permitted".

When the CCI transmitted from the CCI detecting unit 2 to the copy generation management unit 8 indicates "Copy One Generation", only one generation of recording is permitted and thus the copy generation management unit 8 stores a binary value "10" in the CGMS field of the D-VHS format data V7 to make the copy protection status of the D-VHS format data V7 into "One Generation of Copy Permitted".

When the CCI transmitted from the CCI detecting unit 2 to the copy generation management unit 8 indicates "Copy Never", recording is prohibited. However, at this time, the MPEG-TS data V4 transmitted as a result of signal selection by the signal selection switch 4 to the copy generation management unit 8 corresponds to the copy-protected-state indicating MPEG-TS data V3 which is generally permitted to be recorded. Thus, the copy generation management unit 8 stores a binary value "00" in the CGMS field of the D-VHS format data V7 to make the copy protection status of the D-VHS format data V7 into "Copy Permitted".

The signal recording unit 9 records the D-VHS format data V8 transmitted from the copy generation management unit 8 on the D-VHS recording medium 10, in a recording mode given by the recording-mode information signal V6 transmitted from the bit-rate detecting unit 6.

As above described, in the MPEG data recording and playback device 100 according to the present invention, when the users try to make copying of digital contents without knowing that CCI of the contents indicates a copy-protected state for prevention of unauthorized copying of the contents, pre-encoded MPEG-TS data stored in predetermined data storage, i.e., data composed of image and/or audio representing that "the copying of the contents has ended in failure because of the CCI thereof stating a copy-protected status", is recorded, instead of the contents to be recorded, on the recording medium 10. Thereby, the users, when playing back the above recorded data on the recording medium 10 afterwards, can find out that the contents they tried to record is copy-protected and thus can easily know that the cause of the failure is not the breakdown of the device 100.

Especially in the MPEG data recording and playback device 100 according to the present invention, data composed of image and/or audio representing that the copying of the contents has ended in failure because of the CCI thereof stating a copy-protected status is held in the device 100 as pre-compressed and pre-encoded stream data. This brings about the advantage of eliminating the need to provide the MPEG data recording and playback device with a circuit for generating data composed of image and/or audio as above described and then compressing and encoding generated data when the CCI indicates a copy-protected state. In this respect, the MPEG data recording and playback device 100 according to the present invention is superior to the conventional one disclosed in Japanese Patent Application Laid-Open No. 2000-333124 (2000).

(Second Preferred Embodiment)

This preferred embodiment is characterized in that a plurality of kinds of copy-protected-state indicating MPEG-TS data, each being obtained by previously encoding data (image and/or audio) describing a copy-protected status into MPEG format, are provided corresponding to different types of copy protection signals, and in that, when a digital interface detects any of the above copy protection signals from a digital data signal received, copy-protected-state indicating MPEG-TS data which corresponds to a type of the detected copy protection signal is selected from the plurality of kinds of copy-protected-state indicating MPEG-TS data and recorded on a predetermined recording medium. Hereinbelow, these characteristics will be described in more detail with reference to the drawing.

Figure 2:
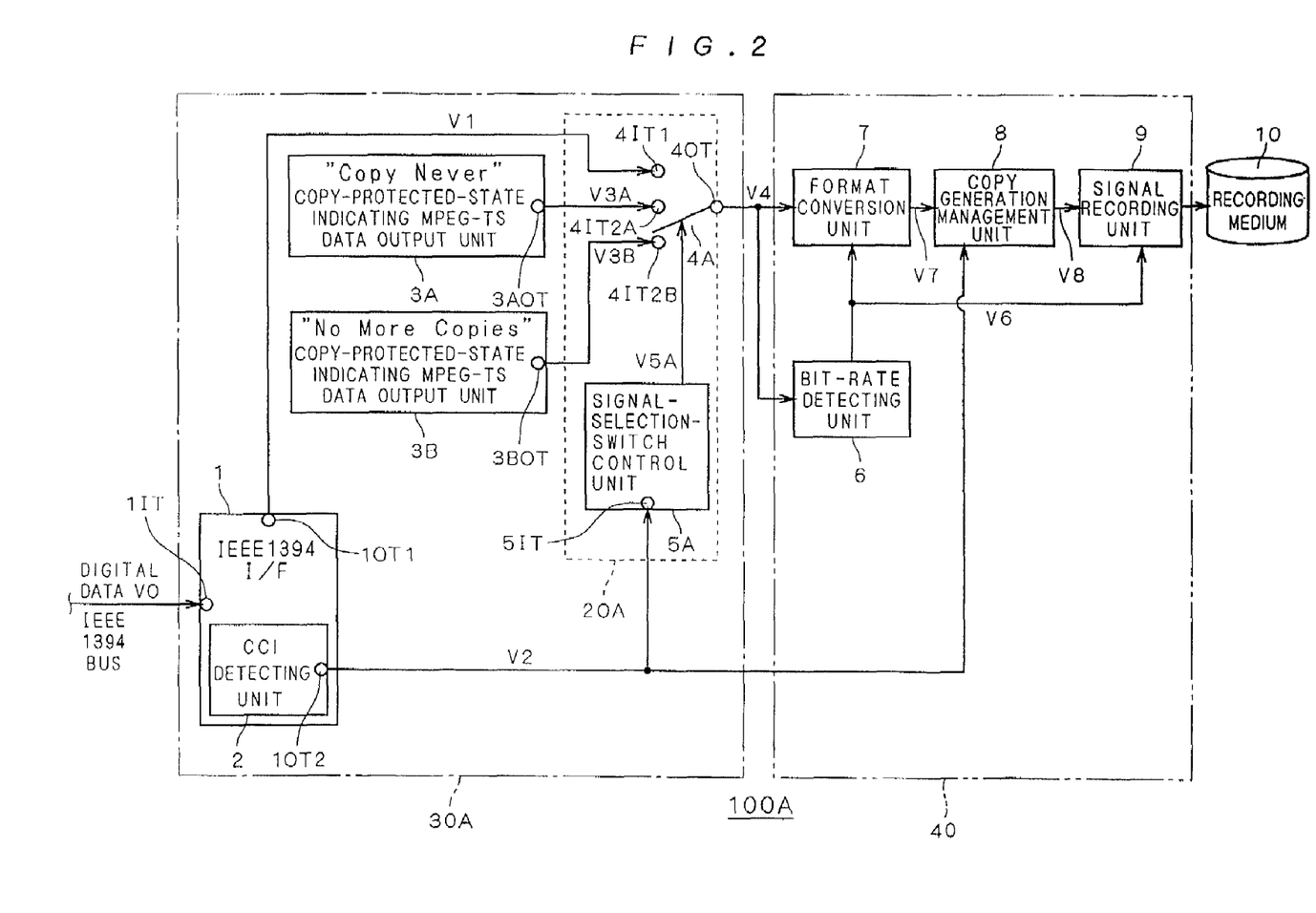
FIG. 2 is a partial block diagram illustrating a configuration of an MPEG data recording and playback device according to a second preferred embodiment of the present invention.

FIG. 2 is a block diagram illustrating by way of example a configuration of the main part of an MPEG data recording and playback device 100A according to this preferred embodiment. In FIG. 2, the same reference numerals are used to designate like or corresponding parts to those described in FIG. 1. The device 100A of FIG. 2 differs from the device 100 of FIG. 1 in the configuration of an MPEG data selector 30A. More specifically, in view of a plurality of levels or kinds of copy protection states represented by the CCI, the device 100A according to this preferred embodiment comprises two copy-protected-state indicating MPEG-TS data output units 3A and 3B, instead of the copy-protected-state indicating MPEG-TS data output unit 3 in FIG. 1, which involves a modification of the configuration of an MPEG-TS data selecting unit 20A. However, the configuration of the IEEE 1394 interface 1 remains unchanged. Hereinbelow, the description of the components of FIG. 2 identical to those described in FIG. 1 will be omitted and only the different component 30A will be described in further detail.

In FIG. 2, the IEEE 1394 interface 1 receives the digital data V0 and extracts the MPEG-TS data V1 from the received digital data V0 to output the data V1 to the first input terminal 4IT1. Also, the interface 1 includes the CCI detecting unit 2 which detects CCI from the digital data V0.

A "Copy Never" copy-protected-state indicating MPEG-TS data output unit (also referred to as a first copy-protected-state indicating MPEG-TS data output unit) 3A has the functions of holding first copy-protected-state indicating MPEG-TS data V3A and outputting the data V3A from its output terminal 3AOT to a second input terminal 4IT2A. The first copy-protected-state indicating MPEG-TS data V3A is obtained by previously encoding, in MPEG format, data which is composed of image and/or audio and represents that CCI in the EMI field of MPEG-TS data desired to be recorded by the user indicates "Copy Never" (referred to also as first CCI). A "No More Copies" copy-protected-state indicating MPEG-TS data output unit (second copy-protected-state indicating MPEG-TS data output unit) 3B has the functions of holding second copy-protected-state indicating MPEG-TS data V3B and outputting the data V3B from its output terminal 3BOT to a third input terminal 4IT2B. The second copy-protected-state indicating MPEG-TS data V3B is obtained by previously encoding, in MPEG format, data which is composed of image and/or audio and represents that CCI in the EMI field of MPEG-TS data desired to be recorded by the user indicates "No More Copies" (referred to also as second CCI).

A signal-selection-switch control unit 5A generates and outputs a control signal V5A according to the CCI given by the copy control signal V2 and a signal selection switch 4A performs switching operations in accordance with instructions of the control signal V5A. Consequently, the MPEG-TS data selecting unit 20A outputs, according to the CCI contents, any one of (1) the MPEG-TS data V1 outputted from the IEEE 1394 interface 1, (2) the first copy-protected-state indicating MPEG-TS data V3A outputted from the first copy-protected-state indicating MPEG-TS data output unit 3A and (3) the second copy-protected-state indicating MPEG-TS data V3B outputted from the second copy-protected-state indicating MPEG-TS data output unit 3B, as the to-be-recorded MPEG-TS data V4 to the signal recorder 40A.

Next, the operation of the MPEG data recording and playback device 100A according to this preferred embodiment will be described with reference to FIG. 2. However, in order to avoid duplication of description, the units operating in similar fashion to those described in the first preferred embodiment, namely, the IEEE 1394 interface 1 (the CCI detecting unit 2); the bit-rate detecting unit 6; the format conversion unit 7; the copy generation management unit 8; the signal recording unit 9; and the D-VHS recording medium 10, will not be described hereinbelow.

The "Copy Never" copy-protected-state indicating MPEG-TS data output unit 3A outputs the first copy-protected-state indicating MPEG-TS data V3A prepared beforehand. The first copy-protected-state indicating MPEG-TS data V3A is an MPEG-TS bit stream (compressed and encoded data) which represents, with text and/or graphics and/or audio, that recording of contents desired to be recorded by the user was not made because the CCI of the contents indicates "Copy Never" (a copy-protected state). This data V3A is to be recorded on the recording medium 10 instead of the above contents when the CCI of the contents indicates "Copy Never" (a copy-protected state). The bit rate of the data V3A is preset to a minimum value (which, however, is not an absolute necessity).

The "No More Copies" copy-protected-state indicating MPEG-TS data output unit 3B outputs the second copy-protected-state indicating MPEG-TS data V3B prepared beforehand. The second copy-protected-state indicating MPEG-TS data V3B is an MPEG-TS bit stream which represents, with text and/or graphics and/or audio, that recording of contents desired to be recorded by the user was not made because the CCI of the contents indicates "No More Copies" (a copy-protected state). This data V3B is to be recorded on the recording medium 10 instead of the above contents when the CCI of the contents indicates "No More Copies" (a copy-protected state). The bit rate of the data V3B is also preset to a minimum value (which, however, is not an absolute necessity as well).

Here, both the first copy-protected-state indicating MPEG-TS data V3A and the second copy-protected-state indicating MPEG-TS data V3B do not require copy protection; therefore, the CCI of these data V3A and V3B should be set to either a "Copy Free" or "Copy One Generation" state. In the present example, for convenience's sake, the CCI of the data V3A and V3B shall be set to a "Copy Free" state.

The signal-selection-switch control unit 5A controls the signal selection switch 4A according to the CCI given by the copy control signal V2. The switch 4A selects the to-be-recorded MPEG-TS data V4 from among the MPEG-TS data V1, the first copy-protected-state indicating MPEG-TS data V3A and the second copy-protected-state indicating MPEG-TS data V3B, and then transmits the data V4 to the bit-rate detecting unit 6 and the format conversion unit 7. The details are as follows.

When the CCI indicates "Copy Free", recording of the contents is permitted and thus the signal-selection-switch control unit 5A generates and outputs a control signal V5A to instruct the signal selection switch 4A to interconnect its first input terminal 4IT1 and output terminal 4OT. Consequently, the signal selection switch 4A transmits the MPEG-TS data V1 transmitted from the IEEE 1394 interface 1 to the bit-rate detecting unit 6 and the format conversion unit 7.

When the CCI indicates "Copy One Generation", only one generation of recording of the contents is permitted and thus the signal-selection-switch control unit 5A generates and outputs a control signal V5A to instruct the signal selection switch 4A to interconnect its first input terminal 4IT1 and output terminal 4OT. Consequently, the signal selection switch 4A transmits the MPEG-TS data V1 to the bit-rate detecting unit 6 and the format conversion unit 7.

On the other hand, when the CCI indicates "No More Copies", recording of the contents is prohibited and thus the signal-selection-switch control unit 5A generates and outputs a control signal V5A to instruct the signal selection switch 4A to interconnect its third input terminal 4IT2B and output terminal 4OT. Consequently, the signal selection switch 4A selects the second copy-protected-state indicating MPEG-TS data V3B and transmits it to the bit-rate detecting unit 6 and the format conversion unit 7.

When the CCI indicates "Copy Never", recording of the contents is prohibited and thus the signal-selection-switch control unit 5A generates and outputs a control signal V5A to instruct the signal selection switch 4A to interconnect its second input terminal 4IT2A and output terminal 4OT. Consequently, the signal selection switch 4A transmits the first copy-protected-state indicating MPEG-TS data V3A to the bit-rate detecting unit 6 and the format conversion unit 7.

As above described, according to this preferred embodiment, (A) when the CCI indicates "Copy Never" (first CCI), first data representing that copying of the contents was not made due to the CCI indicating "Copy Never" is recorded, and (B) when the CCI indicates "No More Copies" (second CCI), second data representing that copying of the contents was not made due to the CCI indicating "No More Copies" is recorded. Thereby the users can more specifically ascertain the reason why copying of the contents has ended in failure.

If, in the future, the number of kinds of copy protection statuses indicated by the CCI increases from the current number, the number of copy-protected-state indicating MPEG-TS data output units should be increased with increased number of kinds.

(Third Preferred Embodiment)

This preferred embodiment provides a modification of the configuration of the signal recorder 40 according to the first or second preferred embodiment. It is characterized in that a predetermined time limit is set for recording of the copy-protected-state indicating MPEG-TS data on the recording medium 10, thereby making effective use of the recording area in the recording medium 10. For convenience's sake, the following description refers to a case where the feature of this preferred embodiment is applied to the first preferred embodiment shown in FIG. 1. It is, of course, possible to apply the feature of this preferred embodiment to the device 100A of FIG. 2.

Figure 3:
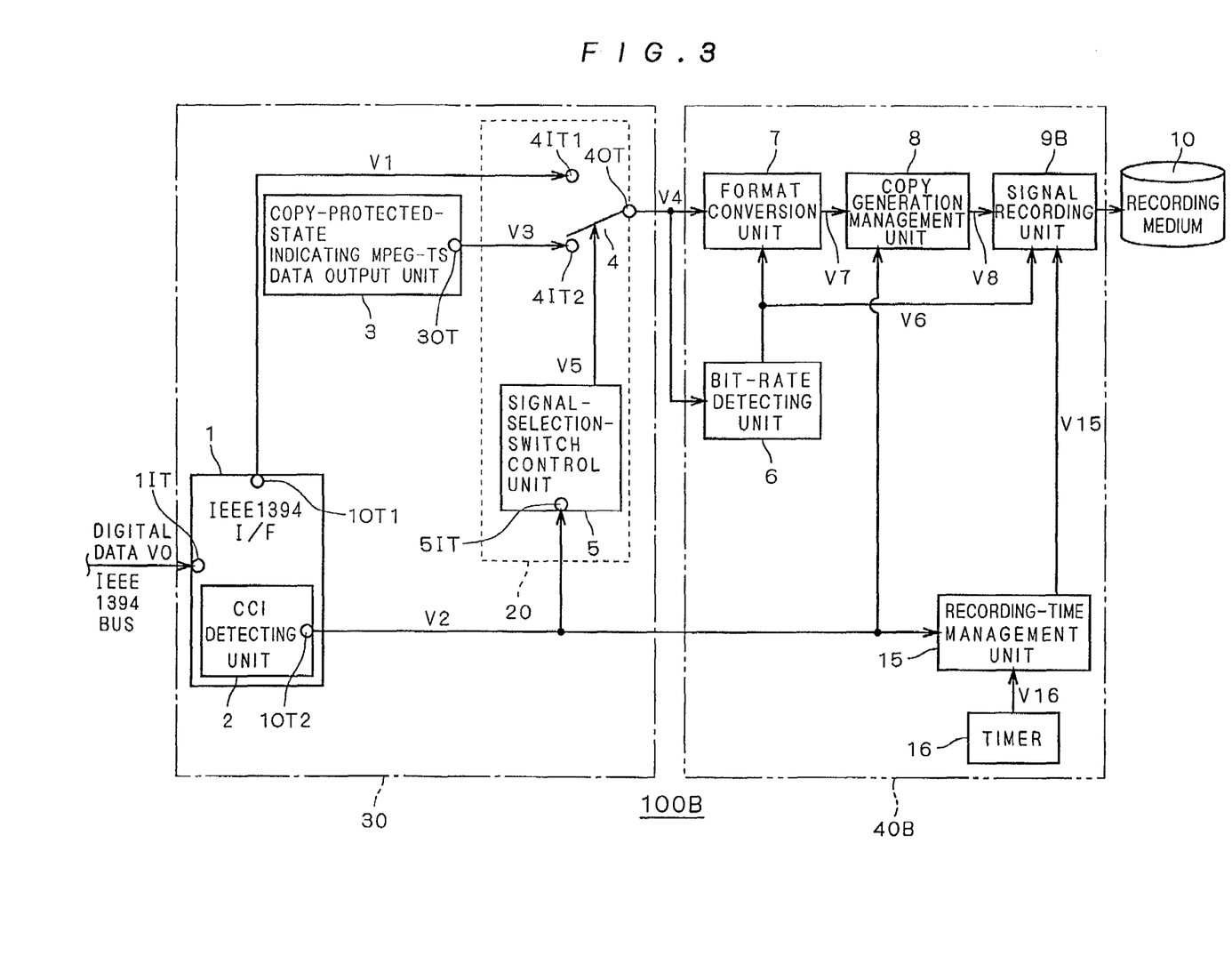
FIG. 3 is a partial block diagram illustrating a configuration of an MPEG data recording and playback device according to a third preferred embodiment of the present invention.

FIG. 3 is a block diagram illustrating by way of example a configuration of the main part of an MPEG data recording and playback device 100B according to this preferred embodiment. In FIG. 3, the same reference numerals are used to designate like or corresponding parts to those described in FIG. 1. The device 100B of FIG. 3 differs from the device 100 of FIG. 1 mainly in the configuration of a signal recorder 40B. The following description thus gives different components in the signal recorder 40B.

In FIG. 3, a timer 16 measures time to output a signal V16 giving time information. A recording-time management unit 15 manages a recording time to record data on the recording medium 10 on the basis of the copy control signal V2 transmitted from the CCI detecting unit 2 and the time information signal V16 transmitted from the timer 16. In accordance with instructions given by a control signal V15 outputted from the recording-time management unit 15, a signal recording unit 9B writes the D-VHS format data V8 obtained from the copy generation management unit 8 onto the D-VHS recording medium 10 in a recording mode given by the signal V6.

Next, the operation of the MPEG data recording and playback device 100B according to this preferred embodiment will be described with reference to FIG. 3. However, the operations of the components identical to those described in the first preferred embodiment, namely, the IEEE 1394 interface 1 (the CCI detecting unit 2); the copy-protected-state indicating MPEG-TS data output unit 3; the signal selection switch 4; the signal-selection-switch control unit 5; the bit-rate detecting unit 6; the format conversion unit 7; the copy generation management unit 8; and the D-VHS recording medium 10, will be omitted from the description.

When the CCI detected in the CCI detecting unit 2 indicates either "Copy Never" or "No More Copies", recording of contents desired to be recorded by the user is prohibited. In that case, instead of the contents, the copy-protected-state indicating MPEG-TS data V3, which was prepared beforehand and outputted from the copy-protected-state indicating MPEG-TS data output unit 3, is recorded on the recording medium 10.

Since the copy-protected-state indicating MPEG-TS data V3 is not the contents desired to be recorded by the user, the data V3 needs to be recorded for at least "the amount of time that the user, at the time of playback, will be able to acquire information that the recording of the contents was not made because the CCI of the contents indicates a copy-protected state". In other words, to continue recording the data V3 on the recording medium 10 for more than the above amount of time is not to make effective use of the recording area in the D-VHS recording medium 10.

The recording-time management unit 15, therefore, when the CCI transmitted from the CCI detection unit 2 indicates either "Copy Never" or "No More Copies", measures whether the recording time for the data V3 reaches a "predetermined amount of time" which has been held as data in the unit 15, on the basis of the time information signal V16 transmitted from the timer 16. When detecting that the recording time has reached the above predetermined amount of time, then, the recording-time management unit 15 outputs the control signal V15 directing a halt on recording to the signal recording unit 9B. Here, the above "predetermined amount of time" is determined based on "the amount of time that the user, at the time of playback, will be able to acquire information that recording of the contents was not made because the CCI of the contents indicates a copy-protected state".

The signal recording unit 9B starts to record the D-VHS format data V8 transmitted from the copy generation management unit 8 on the D-VHS recording medium 10 in a recording mode based on the recording-mode information signal V6 transmitted from the bit-rate detecting unit 6, but, it will stop recording on the D-VHS recording medium 10 when directed so by the recording-time management unit 15.

As above described, according to this preferred embodiment, the recording-time management unit 15 manages the recording time for the copy-protected-state indicating MPEG-TS data V3 for optimization, thereby allowing effective use of the recording area in the recording medium 10.

(Fourth Preferred Embodiment)

Figure 4:
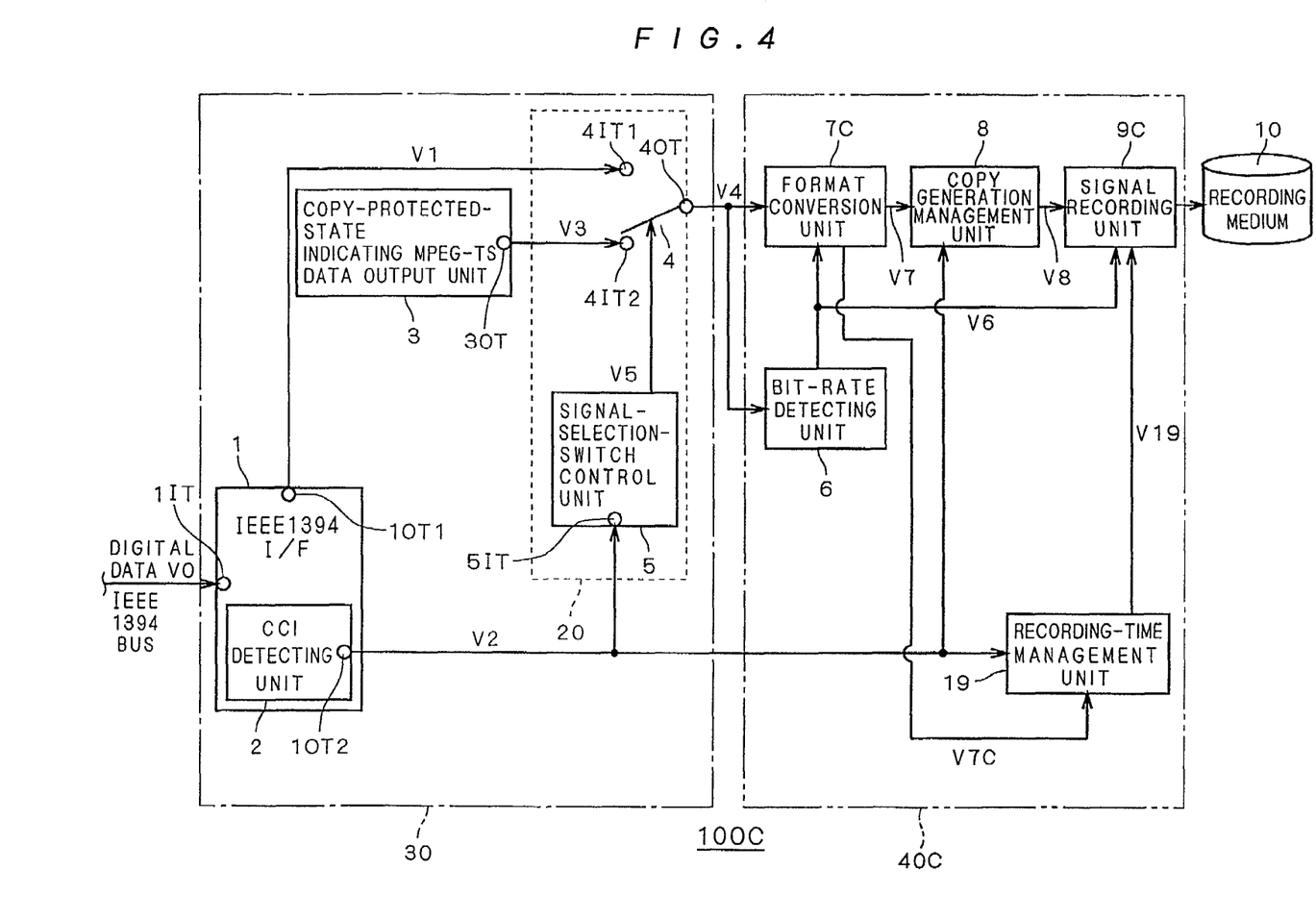
FIG. 4 is a partial block diagram illustrating a configuration of an MPEG data recording and playback device according to a fourth preferred embodiment of the present invention.

FIG. 4 is a block diagram illustrating by way of example a configuration of the main part of an MPEG data recording and playback device 100C according to this preferred embodiment. This preferred embodiment differs from the first preferred embodiment in the configuration of a signal recorder 40C and in other respects, it is identical to the first preferred embodiment. However, the selector 30 of FIG. 4 may be replaced by the selector 30A of FIG. 2. The following description gives only different components in FIG. 4, omitting those designated by the same reference numerals as in FIG. 1.

In FIG. 4, a format conversion unit 7C converts the to-be-recorded MPEG-TS data V4 obtained via the signal selection switch 4 into the D-VHS format data V7 and transmits to a recording-time management unit 19 a signal V7C that gives information about the number of screens for trickplay data for high-speed search generated at the time of format conversion. The recording-time management unit 19 manages a recording time to record the copy-protected-state indicating MPEG-TS data V3 on the recording medium 10 on the basis of the copy control signal V2 transmitted from the CCI detecting unit 2 and the signal V7C giving information about the number of screens for trickplay data for high-speed search, which is transmitted from the format conversion unit 7C. A signal recording unit 9C, in accordance with instructions given by a control signal V19 outputted from the recording-time management unit 19, writes the D-VHS format data V8 obtained by the copy generation management unit 8 onto the D-VHS recording medium 10.

Next, the operation of the MPEG data recording and playback device 100C according to this preferred embodiment will be described with reference to FIG. 4. However, the components operating in similar fashion to those described in the first preferred embodiment, namely, the IEEE 1394 interface 1 (the CCI detecting unit 2); the copy-protected-state indicating MPEG-TS data output unit 3; the signal selection switch 4; the signal-selection-switch control unit 5; the bit-rate detecting unit 6; the copy generation management unit 8; and the D-VHS recording medium 10, will be omitted from the description.

The format conversion unit 7C converts the to-be-recorded MPEG-TS data V4 transmitted via the signal selection switch 4 into the D-VHS format data V7. In the D-VHS standard, trickplay data for high-speed search is generated from MPEG-TS data for normal playback at the time of recording and it is recorded together with the MPEG-TS data for normal playback. Accordingly, the D-VHS format data V7 includes both the MPEG-TS data for normal playback and the MPEG-TS trickplay data for high-speed search. From this, the format conversion unit 7C generates trickplay data for high-speed search from MPEG-TS data V4 for normal playback transmitted via the signal selection switch 4, and at the same time transmits information about the number of screens for trickplay data for high-speed search as the signal V7C to the recording-time management unit 19.

When the CCI transmitted from the CCI detecting unit 2 indicates either "Copy Never" or "No More Copies", the recording-time management unit 19 detects whether the information about the number of screens for trickplay data for high-speed search, which is transmitted from the format conversion unit 7C, coincides with a "specific number of screens" being held as data in the recording-time management unit 19. When both coincide with each other, the recording-time management unit 19 directs the signal recording unit 9C to stop the recording of the copy-protected-state indicating MPEG-TS data V3. Here, the above specific number of screens is equal to or more than one and is determined based on the number of screens generated for trickplay data for high-speed search, the number indicating that the user will be able to recognize, even at high-speed search playback, a fact that the recording was not made due to the copy-protected state indicated by the CCI of the contents.

As above described, according to this preferred embodiment, even at high-speed search playback, the recording time for display data, which represents that copying was not made because the CCI indicates a copy-protected state, can be so set that at least one frame of the display data will be displayed. Besides, the recording time is set to such an amount of time that the user will be able to recognize the display data. This allows effective use of the recording area in the recording medium 10.

While the invention has been shown and described in detail, the foregoing description is in all aspects illustrative and not restrictive. It is therefore understood that numerous modifications and variations can be devised without departing from the scope of the invention.

What is claimed is:

1. An MPEG data selector comprising:
   a digital interface having an input terminal receiving digital data which includes MPEG Transport Stream (MPEG-TS) data of digital contents and copy control information for use in preventing unauthorized copying of said digital contents, a first output terminal outputting said MPEG-TS data, and a second output terminal outputting a copy control signal, said digital interface extracting said MPEG-TS data from said digital data received, and detecting said copy control information from said digital data to generate said copy control signal indicating the contents of said copy control information;
   a copy-protected-state indicating MPEG-TS data output unit holding copy-protected-state indicating MPEG-TS data and having an output terminal outputting said copy-protected-state indicating MPEG-TS data, said copy-protected-state indicating MPEG-TS data being obtained by previously compressing and encoding, in MPEG format, a message representing that said copy control information indicates a copy-protected state; and
   an MPEG-TS data selecting unit having a first input terminal connected to said first output terminal of said digital interface, a second input terminal connected to said second output terminal of said digital interface, a third input terminal connected to said output terminal of said copy-protected-state indicating MPEG-TS data output unit, and an output terminal outputting to-be-recorded MPEG-TS data, said MPEG-TS data selecting unit selecting either said MPEG-TS data or said copy-protected-state indicating MPEG-TS data as said to-be-recorded MPEG-TS data according to the contents of said copy control information given by said copy control signal.

2. The MPEG data selector according to claim 1, wherein said MPEG-TS data selecting unit selects said MPEG-TS data as said to-be-recorded MPEG-TS data when said copy control information indicates a state other than said copy-protected state, and selects said copy-protected-state indicating MPEG-TS data as said to-be-recorded MPEG-TS data when said copy control information indicates said copy-protected state.

3. The MPEG data selector according to claim 2, wherein a bit rate of said copy-protected-state indicating MPEG-TS data is preset to a minimum value of a plurality of bit rates adaptable for recording by an MPEG data recorder for recording said to-be-recorded MPEG-TS data on a predetermined recording medium.

4. The MPEG data selector according to claim 2, wherein there are at least first copy control information and second copy control information;
   said copy-protected-state indicating MPEG-TS data output unit comprises a first copy-protected-state indicating MPEG-TS data output unit and a second copy-protected-state indicating MPEG-TS data output unit, said first copy-protected-state indicating MPEG-TS data output unit holding first copy-protected-state indicating MPEG-TS data which is obtained by previously compressing and encoding data representing said first copy control information in MPEG format, and having an output terminal outputting said first copy-protected-state indicating MPEG-TS data, said second copy-protected-state indicating MPEG-TS data output unit holding second copy-protected-state indicating MPEG-TS data which is obtained by previously compressing and encoding data representing said second copy control information in MPEG format, and having an output terminal outputting said second copy-protected-state indicating MPEG-TS data;

said third input terminal of said MPEG-TS data selecting unit comprises an input terminal connected to said output terminal of said first copy-protected-state indicating MPEG-TS data output unit, and another input terminal connected to said output terminal of said second copy-protected-state indicating MPEG-TS data output unit; and said MPEG-TS data selecting unit selects said first copy-protected-state indicating MPEG-TS data as said to-be-recorded MPEG-TS data when said copy control information is said first copy control information, and selects said second copy-protected-state indicating MPEG-TS data as said to-be-recorded MPEG-TS data when said copy control information is said second copy control information.

5. An MPEG data recorder comprising:

an MPEG data selector including a digital interface having an input terminal receiving digital data which includes MPEG-TS data of digital contents and copy control information for use in preventing unauthorized copying of said digital contents, a first output terminal outputting said MPEG-TS data, and a second output terminal outputting a copy control signal, said digital interface extracting said MPEG-TS data from said digital data received, and detecting said copy control information from said digital data to generate said copy control signal indicating the contents of said copy control information;

a copy-protected-state indicating MPEG-TS data output unit holding copy-protected-state indicating MPEG-TS data and having an output terminal outputting said copy-protected-state indicating MPEG-TS data, said copy-protected-state indicating MPEG-TS data being obtained by previously compressing and encoding, in MPEG format, a message representing that said copy control information indicates a copy-protected state; and an MPEG-TS data selecting unit having a first input terminal connected to said first output terminal of said digital interface, a second input terminal connected to said second output terminal of said digital interface, a third input terminal connected to said output terminal of said copy-protected-state indicating MPEG-TS data output unit, and an output terminal outputting to-be-recorded MPEG-TS data, said MPEG-TS data selecting unit selecting either said MPEG-TS data or said copy-protected-state indicating MPEG-TS data as said to-be-recorded MPEG-TS data according to the contents of said copy control information given by said copy control signal; and a signal recording device recording said to-be-recorded MPEG-TS data outputted from said MPEG data selector on a predetermined recording medium.

6. The MPEG data recorder according to claim 5, wherein said signal recording device sets a predetermined time limit for recording of said copy-protected-state indicating MPEG-TS data on said predetermined recording medium when said to-be-recorded MPEG-TS data is said copy-protected-state indicating MPEG-TS data, said predetermined time limit being determined based on the amount of time that a user, at the time of playback, will be able to recognize that said MPEG-TS data extracted from said digital data could not be recorded because said copy control information indicates said copy-protected state.

7. The MPEG data recorder according to claim 5, wherein said signal recording device, after performing a format conversion of said to-be-recorded MPEG-TS data into D-VHS format data, records said D-VHS format data on said predetermined recording medium, and said signal recording device, when said to-be-recorded MPEG-TS data is said copy-protected-state indicating MPEG-TS data, detects whether information about the number of screens for trick-play data for high-speed search generated at the time of said format conversion coincides with a specific number of screens which has been held in said signal recording device, and when they coincides with each other, said signal recording device stops recording of said copy-protected-state indicating MPEG-TS data on said predetermined recording medium, said specific number of screens being determined based on the number of screens that the user, at the time of high-speed search playback, will be able to recognize that said MPEG-TS data extracted from said digital data could not be recorded because said copy control information indicates said copy-protected state.

8. An MPEG data selector comprising:

an IEEE 1394 interface receiving digital data in isochronous packet form;

a read only memory holding copy-protected-state indicating MPEG-TS data which is obtained by previously compressing and encoding, in MPEG format, a message representing that copy control information contained in said digital data indicates a copy-protected state; and a signal selection switch having a first input terminal receiving MPEG-TS data extracted from said digital data and outputted from said IEEE 1394 interface, a second input terminal receiving said copy-protected-state indicating MPEG-TS data outputted from said read only memory, and an output terminal outputting to-be-recorded MPEG-TS data, said signal selection switch connecting said first input terminal to said output terminal when said copy control information extracted from said digital data and outputted from said IEEE 1394 interface indicates a state other than said copy-protected state, and connecting said second input terminal to said output terminal when said copy control information indicates said copy-protected state.

* * * * *